W. M. FULTON.
PACKLESS VALVE.
APPLICATION FILED AUG. 21, 1916.

1,381,818.

Patented June 14, 1921.

Inventor
Weston M. Fulton,
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

PACKLESS VALVE.

1,381,818.  Specification of Letters Patent.  Patented June 14, 1921.

Application filed August 21, 1916. Serial No. 116,003.

*To all whom it may concern:*

Be it known that I, WESTON M. FULTON, a citizen of the United States of America, and a resident of Knoxville, Tennessee, have invented a new and useful Improvement in Packless Valves, which invention is fully set forth in the following specification.

This invention relates to valves of the type frequently designated as "packless" valves.

It is an object of this invention to provide an improved valve of the type referred to wherein the valve member is positively moved in one direction by its actuating stem and wherein movement of the valve member in the opposite direction is produced by the inherent resiliency of the flexible partition wall which separates the valve stem from the fluid passage. It is a further object of this invention to provide a valve of the type referred to which can be more easily assembled, and disassembled for inspection and repair, than those heretofore constructed. Another object of this invention is to provide a valve of the type referred to in which the valve actuating member does not interfere with the proper seating of the valve member. Still other objects relate to the provision of a valve that is simple in construction, inexpensive to manufacture, and efficient in operation.

Stated broadly, the invention comprises a packless valve wherein the valve member is connected to a flexible partition wall separating the valve stem from the fluid passage, said partition wall possessing an inherent resiliency whereby it is capable of moving the valve member throughout its range of movement in one direction and preferably taking the form of an expansible and collapsible corrugated tubular vessel. To facilitate assembling and disassembling, the valve stem, which, in the form shown, is positioned within the housing constituted by said wall, has a one-way connection with the movable end of such housing whereby it may move the same and its connected valve member in one direction, movement of this end and its connected valve member in the opposite direction as the valve stem is withdrawn depending upon the resiliency inherent in said partition wall.

The invention is capable of receiving a variety of mechanical expressions, two of which, for the purposes of illustration, have been shown on the accompanying drawing, but it is to be expressly understood that they are for purposes of illustration only, and are not to be construed as definitive of the limits of the invention, reference being had to the appended claims for that purpose.

Figure 1:
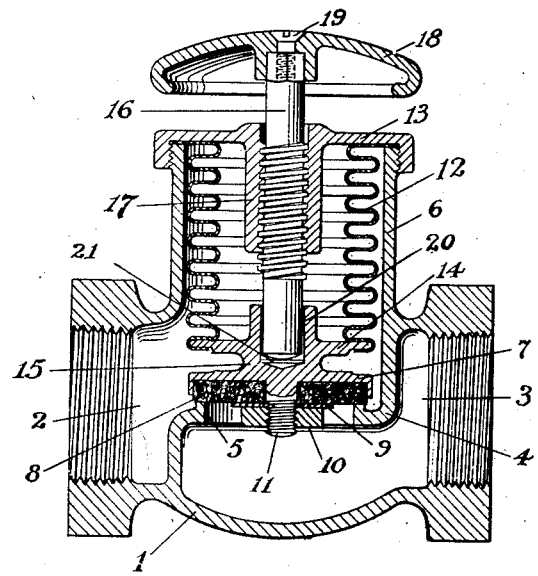
Figure 2:
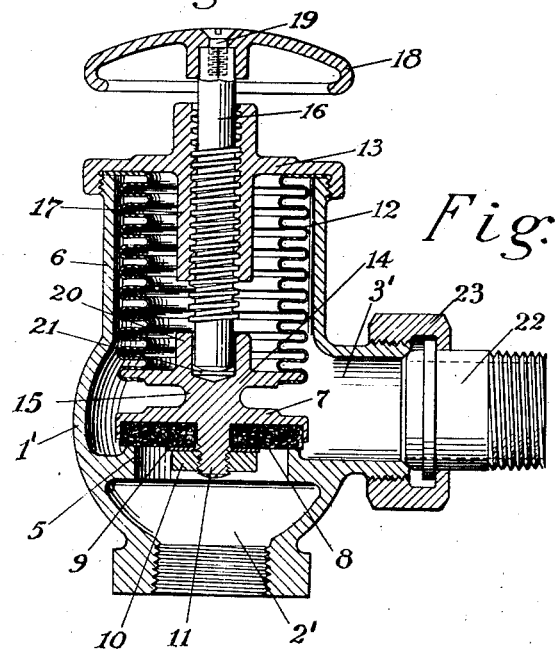

Referring to the drawing, wherein the same reference characters designate corresponding parts in both figures, Figure 1 illustrates an embodiment of the present invention in a globe valve;

Fig. 2. illustrates an embodiment of the invention in an angle valve.

In the form shown in Fig. 1, 1 represents the housing of a globe valve provided at its opposite ends with the passages 2 and 3, screw-threaded or otherwise provided with means for connection to conduits as is usual with valves of this type. 4 represents the usual transverse wall provided with a valve port and seat 5. 6 represents an extension of the housing for the reception of the valve stem and the mounting of its bonnet. The valve member 7 may be of any suitable construction, that illustrated comprising a recessed member carrying a seating element 8 of hard fiber, or other suitable material, retained in position by the washer 9 and nut 10 received upon the screw-threaded teat 11 projecting axially from the valve member 7.

In the type of valves known as packless valves, the valve member is carried by or connected to a flexible wall which provides a fluid-tight partition in the valve casing and separates the valve stem from the fluid passage. According to the present invention this flexible partition wall is so constructed as to possess an inherent resiliency whereby, if the valve member is moved in one direction with a consequent stressing of the flexible wall, there is a resultant inherent tendency in the wall to return the valve member to a position corresponding to its unstressed condition. In the form shown, the flexible wall constitutes a housing for the valve stem and is composed of an expansible and collapsible tubular member or vessel 12, preferably constructed of corrugated metal, whereby, if the vessel is expanded beyond its normal condition, the same has an inherent tendency, owing to its resiliency, to return or contract to its normal condition. One end of this expansible and collapsible vessel 12 is clamped against the extension 6 of the valve housing by the 110 bonnet 13, the latter being desirably provided with screw-threads to engage corresponding screw-threads upon the said extension. Thereby is this end of the aforesaid vessel retained in fixed position and makes a fluid-tight joint with the valve casing. The opposite end of the vessel is formed by or secured to a wall 14 connected to or integral with the valve member 7, the connection preferably comprising a reduced neck, as shown at 15. The said wall 14 constitutes the movable end wall of the expansible and collapsible vessel and, owing to its connection with the valve member 7, movement of said end wall produces a corresponding movement of the valve member. The valve stem 16 is carried by the bonnet 13, the latter being preferably provided with an interiorly threaded sleeve 17 for the reception of exterior threads upon the stem. Suitably secured to the upper end of the valve stem 16 is the usual or any preferred form of valve wheel or hand-operating member 18, shown as secured to the stem by a screw 19.

To provide for the ready assemblage and disassemblage of the valve stem and flexible wall, and to enable the withdrawal of the valve stem without disturbing the flexible wall, the lower end of the said stem is shown as rotatably and freely engaged in a socket member 20 provided upon the movable end wall of the vessel. In order that expansion and contraction of the valve stem shall not produce a corresponding movement of the valve member, a spring member as a piece of spring bronze, indicated at 21 is preferably inserted within the socket member 20, the end of the valve stem bearing upon said member.

It is frequently desirable that the valve member shall be balanced with respect to the flexible wall, whereby it becomes immaterial to the operation of the valve in which direction the fluid controlled thereby flows past the same. In the embodiment illustrated such balancing of the valve is obtained by proportioning the effective area of the said end wall to equal the opposed effective area of the valve member.

The embodiment of the invention illustrated in Fig. 2 is in all essential respects the same as that illustrated in Fig. 1, except that the invention is illustrated as applied to an angle valve. 1' represents the valve housing of an angle valve of known type provided with the passages 2' and 3' for connection with the usual conduits, the latter passage having the usual tail-piece 22 connected to the housing by any suitable form of union 23.

In operation, rotation of the valve stem in the proper direction produces a longitudinal movement of the same downwardly, its coaction with the movable end wall of the vessel 12 causing the latter to expand, and thereby moving the valve member onto its seat. Owing to the interposition of the spring member 21 between the stem and the movable end wall 14, said spring member is placed under tension by the movement of the stem before the movement of the latter is transmitted to the end wall 14. Thus any subsequent contraction of the stem will be compensated for by the resiliency of such spring member without a corresponding movement of the valve member. When it is desired to open the valve, rotation of the valve stem in the opposite direction produces an upward longitudinal movement thereof. Owing to the one-way connection between the stem and the movable end wall of the vessel 12, the latter movement of the stem does not withdraw such end wall or the valve member from engagement with its seat. Owing to the resiliency inherent in such vessel, however, the vessel contracts withdrawing the valve member from its seat and maintaining the end wall 14 in normal operative relationship to the stem.

Owing to the one-way connection between the valve stem and the movable end wall of the vessel 12, the parts may be assembled and disassembled with ease; thus the valve stem may be withdrawn independently of the flexible partition wall or the valve member. At the same time, the type of connection employed between the valve stem and the movable end wall 14 enables the valve stem to contract without displacing the valve member and to expand without injury to the parts. Furthermore, this type of connection enables the valve member to seat properly notwithstanding any warping or lack of alinement of the valve stem. Also, owing to the proportioning of the effective area of the movable end wall 14 to equal that of the opposed face of the valve member, it is apparent that the valve will be balanced, as aforesaid, and thereby it becomes immaterial in which direction the fluid flows past the valve. While the sleeve 17 has been shown as provided within the space inclosed by the vessel 12, it will be apparent that the sleeve may be made to extend partly or entirely on the opposite side of the bonnet, whereby the vessel may be reduced in size.

While the constructions shown have been described with considerable particularity, it is to be expressly understood that the invention is not to be restricted to the embodiments illustrated and described, as the invention is susceptible of embodiment in a variety of mechanical expressions, some of which will readily suggest themselves to those skilled in the art, while certain features of the invention are capable of use to the exclusion of others. Thus, while the flexible partition has been described in its preferred embodiment as an expansible and collapsible corrugated metal vessel, whereby the requisite resiliency is supplied by the material of the wall itself, it is apparent that a similar result could be obtained by the use of non-resilient material for the wall with the inherent resiliency supplied by a spring constituting a part thereof. Reference is to be had to the appended claims, therefore, in determining the limits of this invention.

What is claimed is:

1. A packless valve comprising a valve casing, a valve member therein, an expansible and collapsible corrugated tubular wall having an inherent resiliency and connected to said valve member, said wall providing a fluid-tight partition in said valve casing, and operating means on the opposite side of said wall from said valve member and having a one-way relation with said wall and valve member to move said valve member in one direction and stress said wall, said valve member being moved in the opposite direction throughout its range of movement by the resiliency inherent in said wall as said operating means is withdrawn.

2. A packless valve comprising a valve casing, a valve member therein, an expansible and collapsible corrugated tubular wall having an inherent resiliency and connected to said valve member, said wall providing a fluid-tight partition in said valve casing, a socket member connected to said wall on the opposite side from said valve member, and a valve stem loosely fitting in but unattached to said socket member, said valve member being moved in one direction and said wall stressed by the corresponding movement of said valve stem, and said valve member being moved in the opposite direction throughout its range of movement by the resiliency inherent in said wall as said valve stem is withdrawn.

3. A packless valve comprising a valve casing, a valve member therein, an expansible and collapsible corrugated tubular wall having an inherent resiliency and connected to said valve member, said wall providing a fluid-tight partition in said valve casing, a valve stem on the opposite side of said wall from said valve member and having a one-way relation with said wall and valve member, and a resilient member interposed between said wall and valve stem, said valve member being moved in one direction and said wall stressed by the corresponding movement of said valve stem, and said valve member being moved in the opposite direction throughout its range of movement by the resiliency inherent in said wall as said valve stem is withdrawn.

4. A packless valve comprising a valve casing, a valve member therein, an expansible and collapsible corrugated tubular metal vessel the wall of which has an inherent resiliency, said vessel having one end fixed to said valve casing to provide a fluid-tight partition therein and its opposite and movable end connected to said valve member, and a valve stem engaging but unattached to the movable end of said vessel whereby movement of said valve stem in one direction stresses the wall of said vessel and moves said valve member but said valve member is moved throughout its range of movement in the opposite direction as the valve stem is withdrawn solely by the resiliency inherent in the wall of said vessel.

5. In a valve, a valve member, an expansible and collapsible member possessing an inherent resiliency and having a movable end wall carrying said valve member, said valve member and said end wall being proportioned to present equal effective areas to the fluid controlled by said valve whereby to balance said valve member, and means having a one-way connection with said end wall for moving said valve member in one direction.

In testimony whereof I have signed this specification.

WESTON M. FULTON.